Nov. 27, 1951   B. S. MINOR   2,576,261
HOOK
Filed Nov. 8, 1948   2 SHEETS—SHEET 1
FIG. 1.
FIG. 2.
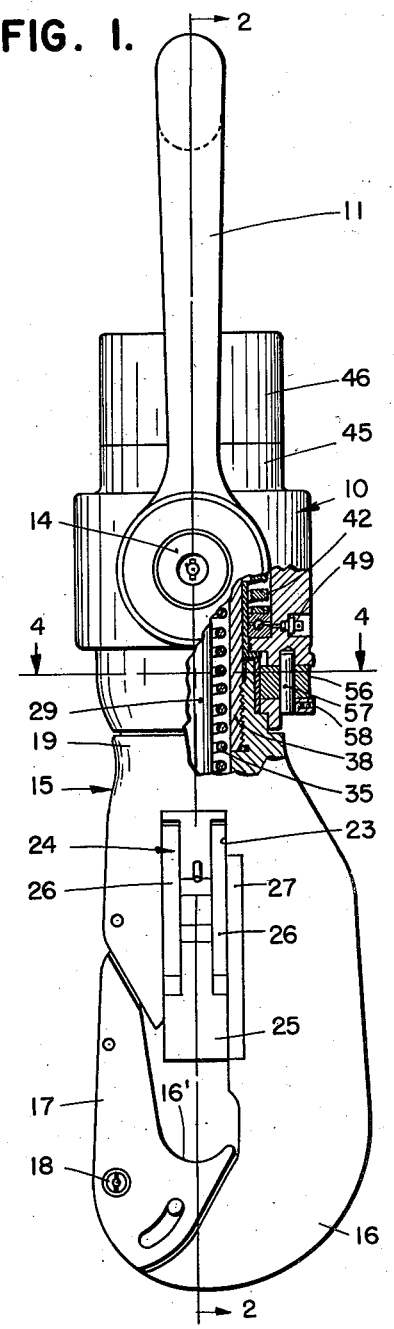
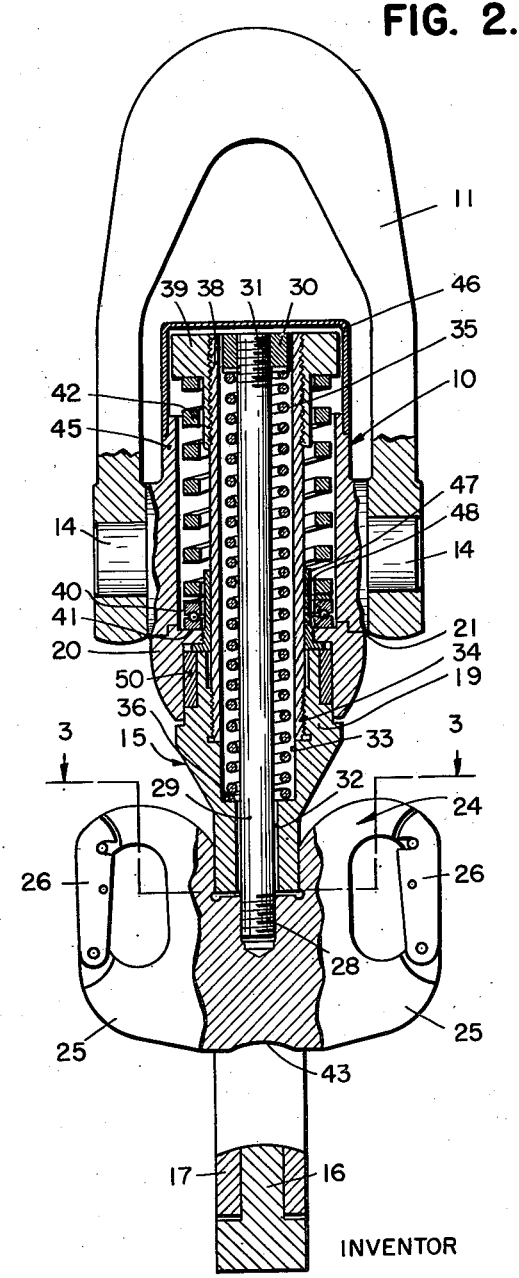
INVENTOR
BURT S. MINOR
BY
Mason & Graham
ATTORNEYS Nov. 27, 1951 — B. S. MINOR — 2,576,261

HOOK

Filed Nov. 8, 1948 — 2 SHEETS—SHEET 2

INVENTOR
BURT S. MINOR
BY
Mason & Shaham
ATTORNEYS

Patented Nov. 27, 1951

2,576,261

UNITED STATES PATENT OFFICE 2,576,261

HOOK

Burt S. Minor, Whittier, Calif., assignor to Regan Forge and Engineering Company, San Pedro, Calif., a corporation of California Application November 8, 1948, Serial No. 58,879

15 Claims. (Cl. 294—82)

This invention relates generally to hooks, and particularly hooks used in the drilling of oil wells by the rotary drilling method. The application is a continuation in part of my application Serial No. 745,475, filed May 2, 1947, for Hook.

In rotary well drilling it is customary to employ a hook attached to the traveling block for suspending the rotary swivel and drill pipe during well drilling operations and for suspending the elevator when pipe is being run in or withdrawn from the well hole. In recent years what may be termed triple hooks have been used which include a relatively large main hook for carrying the rotary swivel and attached drill pipe, or in other words, the heavier loads, and a pair of smaller auxiliary hooks in the form of a double bight yoke for suspending the elevator by its two links. It is an object of this invention to provide a novel improved hook of this triple hook type.

It is a particular object of the invention to provide in a hook of the type indicated means for resiliently suspending both the main hook and the auxiliary hooks or yoke in such a manner that, when used, relatively light loads may be suspended from the yoke under relatively light tension and relatively heavy loads suspended from either the yoke or the main hook under relatively greater tension. In this connection, it is an object to provide a hook embodying a dual spring construction in which a light spring is employed for suspending the yoke and a heavier spring is used for suspending the main hook. It is a further object to provide a construction whereby the load on the yoke, if it exceeds a given amount, will be transferred to the main hook and carried by the heavier spring.

It is a still further object to provide a construction whereby, if the total load on any of the hooks exceeds a given amount, the excess of the load over such amount will be directly supported by the body of the hook independently of the spring means thereof. In this connection, it is a particular object of the invention to provide a construction embodying spring means for resiliently suspending the hooks wherein the spring means may be compressed only a limited amount, after which the load on the hook will be transferred to the body thereof without further stressing the springs.

It is also an object of the invention to provide a triple type hook in which a yoke, formed to provide a pair of auxiliary hooks, and mounted on a spring supported stem slidable in the body of the main hook cooperates with the main body of the hook in a manner to relieve any bending action on the yoke stem. It is a further object to provide a construction wherein the yoke is slidable in the body of the main hook and when subjected to a load exceeding a given amount will be received in the bight of the main hook and be supported thereby.

A particular object of the invention is to provide an improved construction of hook, embodying a spring for resiliently supporting the hook, in which means are provided to permit pre-loading of the spring to any desired amount without transferring the force of the spring as pre-loaded to the portion of the hook supported by the spring.

It is a further object of the invention to provide a rotary or swiveled hook, in which the hooked part is suspended on a spring, and in which the spring is pre-loaded and the force of the spring resulting from the pre-loading is entirely carried by the body of the hook part from the portion of the hook suspended on the spring.

These and other objects will be apparent from the drawing and the following description. Referring to the drawings:

Fig. 1 is an elevational view, partly in section, of a hook embodying the invention;

Fig. 2 is a sectional elevation on line 2—2 of Fig. 1;

Figure 3:
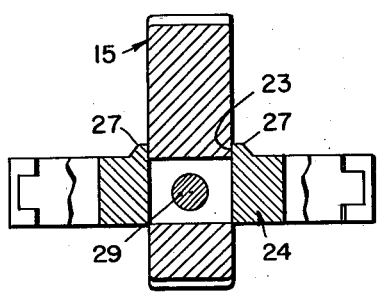
Fig. 3 is a sectional plan view on line 3—3 of Fig. 2.

More particularly describing the invention, reference numeral 10 generally indicates the swivel body of the hook to which is attached a bail 11 mounted on suitable trunnions 14. Below the body 10 is a main hook body 15 which includes a hook 16 having a suitable keeper 17 which is pivotally mounted at 18 and may be of any suitable construction and cooperate with any suitable latch mechanism for releasably securing the same in the closed position in which it is shown. The main hook body also includes a shank 19 extending into the lower portion of the swivel body formed by a ring 20 welded at 21 to body 10. The means for suspending the hook body will be described later. The body of the main hook is provided with a vertical slot 23 which slidably receives a yoke, generally indicated by 24, formed to provide a pair of hooks 25 provided with suitable keepers 26. The yoke, at one side, is formed to provide a pair of guide shoulders 27 (Fig. 3) which receive the marginal portion of the wall defining one side of the slot 23.

As previously indicated, it is a particular object of the invention to resiliently mount both the yoke 24 and the main hook, so that relatively light loads such as are carried by the elevator which is normally attached to the auxiliary hooks 25 of the yoke may be resiliently supported thereby and relatively heavier loads may be resiliently supported on the main hook. In order to accomplish this, the yoke 24 is mounted on the lower threaded end 28 of a stem 29. At its upper end the stem carries a nut 30 which is secured to threaded portion 31 of the stem, as shown. The shank 19 of the main hook body is bored at 32 to receive the stem. It is also provided with a counterbore 33 and a second counterbore 34. The yoke and stem are yieldably supported as a unit in the upper or normal position shown by means of a compression spring 35 which extends between the nut 30 and an inwardly extending shoulder 36 in the shank of the main hook body.

The shank of the main body is threaded in the counterbore 34 to receive a hollow stem 38 which is provided at its upper end with a nut 39 threaded thereon. Intermediate the nut and thrust bearing 40 seated on a flange 41 of ring 20 is a relatively stiff or heavy main spring 42 which serves to hold the hollow stem 38 and main hook body in the upward position shown.

It will be apparent that with the construction described, the yoke 24 is resiliently supported by the spring 35 up to the limit of travel of the yoke within the slot 23 in the main hook body. If a sufficiently heavy load is placed on the yoke to compress the spring substantially, the yoke will come to rest in the bight 16' of the main hook, the yoke being provided with a recess 43 for this purpose. Any weight in excess of the load required to compress the spring sufficiently to bring the yoke down to its lowermost position where it resest in the bight of the main hook will be transferred to the main hook and will be carried by the heavy main spring 42.

It also may be pointed out that the interlocking construction of the yoke and hook body resulting from the provision of the guide shoulders 27 on the yoke, effectively relieves the stem 29 of any stresses tending to bend it. This is an important feature since, in use, the yoke is often subjected to uneven loading because of unequal length of links supporting the elevator or because of the yielding or breaking of one of the links under load.

Means are provided for preventing the compression of the main or relatively heavy spring 42 more than a limited amount. This means comprises an upstanding annular wall 45 which extends upwardly from the swivel body 10 to a point spaced a short distance below the nut 39 when the same is in the upward position. A removable cap 46 is mounted on the wall 45. Thus, as the nut 39 moves downwardly and if the weight on the hook is sufficient, it will abut the upper edge of the annular wall 45 and all excess weight over that necessary to compress the spring to this point will be directly carried by the swivel body.

It will be apparent that the assembly of the hooks and springs is ordinarly free to rotate within the swivel body on the bearing 49. It is desirable to provide a means of retaining lubricant at the bearing and to accomplish this an upstanding sleeve 47 is threaded into the ring 20 to provide an annular well 48 in the region of the bearing which can be supplied with lubricant through fitting 49.

Figure 4:
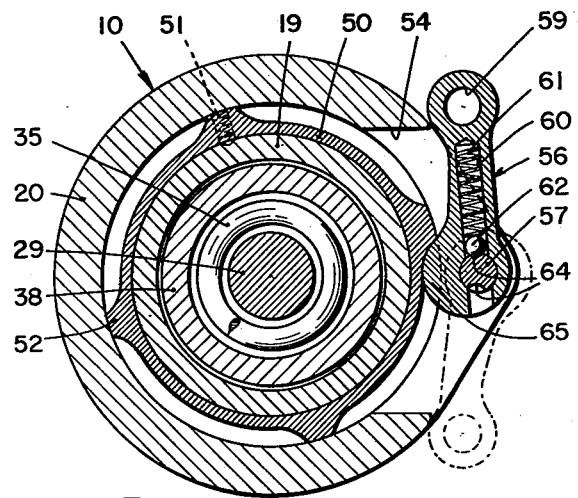
Fig. 4 is a sectional plan view on line 4—4 of Fig. 1.

As previously pointed out, it is desirable to provide a means for locking the parts against rotation and preferably such means should permit of limited back lash or play. One such means for accomplishing this is shown in Figs. 1, 2 and 4, wherein the shank 19 of the hook body is provided with a collar 50, which is non-rotatable, secured thereto by means of a set screw 51. The collar is provided with any suitable number of substantially radially extending projections 52. The ring 20 of the swivel body is provided with an elongated slot or window 54 to accommodate a latch plate 56, pivotally mounted on a vertically extending pin 57, secured in the ring 20 by a set screw 58. The latch plate 56 includes a handle portion 59 bored at 60 to receive a spring 61 and ball 62, receivable within recesses 64 for releasably positioning the handle. The latch plate is provided with an eccentric shaped portion 65 surrounding the pin 57 which is adapted to bear against a side of one of the projections 52 of the collar 50, as shown in Fig. 4, when the latch is in anti-swivel or locked position. It will be apparent that with the construction described, any force tending to cause the hook to rotate clockwise of the device, as shown in Fig. 4, will more firmly lock the parts together. In this connection it may be noted that the handle of the latch plate, when in a latched or locked position, bears against the side of the ring 20.

Figure 5:
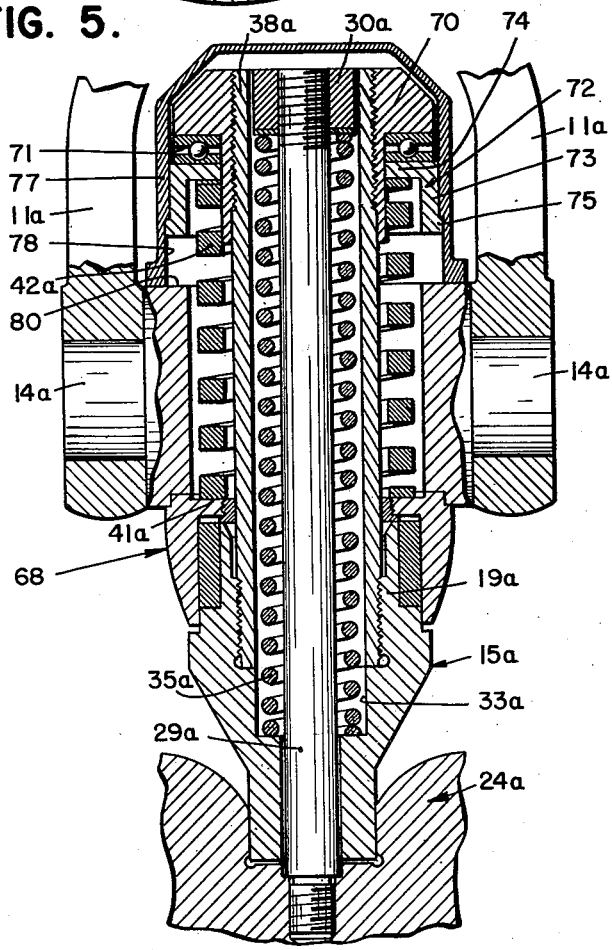
Fig. 5 is a fragmentary enlarged sectional elevational view of a hook embodying another form of the invention.

In Fig. 5 there is shown another form of the invention, wherein means are provided to permit pre-loading of the main spring without transferring the force stored in the pre-loaded spring to any parts of the structure which would interfere with the rotation of the hook body relative to the swivel body. For convenience and clarity, the parts of the device shown in Fig. 5, which are the same as the parts of the hook previously described, will be identified with the reference numerals used on Figs. 1 to 4 of the drawing, except for the distinguishing suffix $a$.

Referring particularly now to Fig. 5, the hook includes the bail 11$a$, supported on trunnions 14$a$, which project from the swivel body 68. Mounted in the swivel body is a main hook body 15$a$ which includes the yoke 24$a$, and which may be considered as being provided with a main hook in all respects identical to the main hook 16 previously described. The yoke 24$a$ is supported by the same means and in the same manner as the yoke 24 previously described.

In this form of the invention, the hook shank 19$a$ also accommodates a hollow stem 38$a$, which is threaded at its upper end to receive the nut 70. This nut rests on a thrust bearing, generally indicated by 71, which in turn is supported on a spring holding ring 72 provided with an annular wall 73 of cylindrical shape, an annular inwardly extending flange 74 at its upper end, and with an external flange 75 at its lower end. The spring holding ring is mounted for limited axial movement within a cap 77, which may be bolted or otherwise secured to the swivel body. The cap is provided with a counter-bore 78 at its lower end, in which the flange 75 of ring 72 rides. This construction limits the height to which the ring 72 may move. The main spring 42$a$ is interposed between the ring 72 and an inwardly extending flange 41$a$ of the swivel body.

It will be apparent from the construction described that the spring 42$a$ in its normal condition may be of such a length that it will be necessary to compress it or pre-load it to install it in the hook. The entire force of the compressed spring is then carried by the swivel body, including the cap 77 attached thereto, and thus in no way interferes with the free rotation of the main hook body of the bearing 71.

Means are also provided for preventing compression of the main spring 42a more than a given amount. This means comprises the annular shoulder 80 formed at the upper end of the swivel body, which acts as an abutment to limit downward movement of the ring 72. When the ring 72 rests on this shoulder the load being carried will be directly transferred to the swivel body.

It will be apparent that in each form of the device described, there is provided a triple type hook in which two of the hooks as a unit are usable for carrying relatively light loads and imparting a relatively small amount of tension to them and that means are also provided for picking up heavier loads and having them resiliently supported with a greater degree of tension. Thus, normally, when the stands of drill pipe are being handled, the same are carried by the yoke to which the elevator is attached, in which case the innermost spring supplies the necessary tension required when making up and breaking out the threaded connections. When handling heavier sections of the drill stem, such as the drill collars on the bottom end just above the bit and the grief stem at the top end, greater spring tension as required to assist the threads during the making up and breaking out of the same is provided by the hook. This is accomplished in the following manner. When the heavier loads are suspended from the yoke member the same comes to rest in the bight of the main hook member and as the main hook member is supported by the main or outside spring, this spring then comes into action and provides the necessary tension for making up and breaking out the threaded connections. In this connection it may be pointed out that it is unsatisfactory to utilize a hook which is resiliently mounted on one relatively heavy spring for handling the lighter portions of the drill stem, and the stands of drill pipe as the tension would be so great that it would be destructive to the last few engaging threads when the threaded joints were being broken or unscrewed.

Although the invention has been particularly shown and described, it is contemplated that various modifications and changes can be made without departing from the scope of the invention as set forth in the following claims.

I claim:

1. In a hook of the type described, a tubular swivel body, a bail mounted on said body for suspending the body, a main hook mounted for limited movement in said body axially thereof, resilient means yieldably resisting movement of said main hook relative to said body under influence of a load on the hook, a yoke providing a pair of auxiliary hooks one at each side of said main hook, said yoke being mounted in said main hook for limited movement longitudinally thereof, secondary resilient means yieldably resisting movement of said yoke relative to said main hook under influence of a load on the yoke, an annular thrust bearing interposed between said first mentioned resilient means and said swivel body, and means forming an annular lubricant retaining well around said bearing.

2. In a hook of the type described, a tubular swivel body, a bail mounted on said body for suspending same, a main hook mounted for limited movement in said body axially thereof, an annular thrust bearing supported in said body, a first spring mounted between said bearing and a part of said hook yieldably resisting movement of the hook relative to said body under influence of a load on said hook, a yoke providing a pair of auxiliary hooks one at each side of said main hook, said yoke being mounted in said main hook for limited movement longitudinally thereof, a second spring between a part of said yoke and said hook yieldably resisting movement of said yoke relative to said main hook under influence of a load on said yoke, and means forming an annular lubricant retaining well around said bearing.

3. In a hook of the type described, a tubular swivel body, a bail mounted on said body, a main hook including a tubular shank rotatably mounted in said body for limited axial movement therein, resilient means yieldably resisting movement of said hook relative to said body under influence of a load on the hook, said main hook having a slot extending upwardly from the bight thereof, a yoke mounted in said slot for limited movement therein, said yoke having a pair of opposed guide shoulders adapted to slidably bear upon the sides of the hook marginal to one side of said slot, said yoke being formed to provide a pair of auxiliary hooks, a stem mounted in said yoke and extending through the shank of said main hook to a point beyond the end thereof, an abutment on said stem, and a compression spring on said stem between the abutment thereon and the shank of said main hook yieldably holding said yoke inwardly relative to said main hook.

4. In a hook of the type described, a tubular swivel body, a bail mounted on said body, a main hook including a tubular shank extending through said swivel body, an abutment on the end of said shank, a compression spring surrounding said shank interposed between said abutment and said body, means on said body engageable by said abutment limiting relative movement of said main hook and said body axially of said shank, a yoke means providing a pair of auxiliary hooks one at each side of said main hook, said yoke means being mounted in said main hook for limited movement longitudinally thereof, and a second spring between a part of said yoke means and said hook yieldably resisting movement of said yoke means relative to said main hook under influence of a load on said yoke means.

5. In a hook of the type described, a tubular swivel body, a bail mounted on said body, a main hook including a tubular shank extending through said swivel body, an abutment on the end of said shank, a compression spring surrounding said shank interposed between said abutment and said body, means on said body engageable by said abutment for limiting relative movement of said main hook and said body axially of said shank, said main hook having a slot extending upwardly from the bight thereof, a yoke mounted in said slot for limited movement therein, said yoke being formed to provide a pair of auxiliary hooks, a stem mounted in said yoke and extending through the shank of said main hook to a point beyond the end thereof, an abutment on said stem, and a compression spring on said stem between the abutment thereon and the shank of said main hook yieldably holding said yoke inwardly relative to said main hook.

6. In a hook of the type described, a tubular swivel body, a bail mounted on said body, a main hook including a tubular shank, a hollow stem mounted in said shank and extending through said body, a nut mounted on said hollow stem, means on said body forming an inwardly projecting shoulder, a bearing means supported on said shoulder, a compression spring surrounding said hollow stem and extending between said nut and said bearing means, means on said body forming an annular abutment in the path of the nut on said hollow stem for limiting movement of the stem when said spring is compressed, said main hook having a slot extending upwardly from the bight thereof, a yoke mounted in said slot for limited movement therein, said yoke being formed to provide a pair of auxiliary hooks, a yoke stem mounted in said yoke and extending through the shank of said main hook and upwardly inside said hollow stem, an abutment nut mounted on said yoke stem, and a compression spring on said yoke stem between said abutment nut and the shank of the main hook.

7. In a hook of the type described, a tubular body, a bail mounted on said body for suspending the body, a main hook mounted for limited movement in said body axially thereof, resilient means yieldably resisting movement of said main hook relative to said body under influence of a load on the hook, a yoke providing a pair of auxiliary hooks one at each side of said main hook, said yoke being mounted in said main hook for limited movement longitudinally thereof, and secondary resilient means yieldably resisting movement of said yoke relative to said main hook under influence of a load on the yoke.

8. In a hook of the type described, a tubular swivel body, a bail mounted on said body, a main hook including a tubular shank rotatably mounted in said body, said main hook having a slot extending upwardly from the bight thereof, a yoke mounted in said slot for limited movement therein, said yoke having a pair of opposed guide shoulders adapted to slidably bear upon the sides of the hook marginal to one side of said slot, said yoke being formed to provide a pair of auxiliary hooks, a stem mounted in said yoke and extending through the shank of said main hook to a point beyond the end thereof, an abutment on said stem, and a compression spring on said stem between the abutment thereon and the shank of said main hook yieldably holding said yoke inwardly relative to said main hook.

9. In a hook of the type described, a tubular swivel body assembly, a bail mounted on said body assembly, a main hook including a tubular shank, a hollow stem mounted in said shank and extending through said body assembly, a nut mounted on said hollow stem, a spring retaining ring mounted in said body assembly for limited axial movement in both directions, an inwardly extending shoulder formed on said body assembly below said ring, a compression spring between said ring and said shoulder, and a bearing means between said ring and said nut.

10. In a hook of the type described, a tubular swivel body assembly, a bail mounted on said body assembly, a main hook including a tubular shank, a hollow stem mounted in said shank and extending through said body assembly, a nut mounted on said hollow stem, a spring retaining ring mounted in said body assembly for limited axial movement, an inwardly extending shoulder formed on said body assembly below said ring, a compression spring betwen said ring and said shoulder, and a bearing means between said ring and said nut, a yoke mounted for limited movement vertically in said hook, a yoke stem extending from said yoke upwardly in said tubular shank of said hook, and a compression spring operatively associated with said stem for yieldably holding said yoke in upward position.

11. In a hook of the type described, a tubular swivel body assembly, a main hook including a shank received in said body assembly for limited vertical movement, a pre-loaded compression spring carried by said body assembly, said body assembly having a ring mounted for limited travel axially and operatively associated with the upper end of said spring, said hook shank being supported on said ring, a yoke mounted for limited movement in said main hook, and means resiliently supporting said yoke in said main hook.

12. In a hook of the type described, a swivel body, a main hook, a compression spring carried by said swivel body in pre-loaded condition, bearing means rotatably supporting said main hook on said spring, and a yoke resiliently supported in said main hook for limited movement therein.

13. In a hook of the type described, a tubular swivel body, a hook body including a shank within said swivel body, a cap mounted on the upper end of said swivel body, means forming an external flange on the upper end of said shank, a spring retaining ring in said cap, abutment means in said cap and on said swivel body limiting axial movement of said ring, a pre-loaded compression spring extending between said ring and a part of said swivel body, and a bearing interposed between said ring and the flange on said hook shank.

14. In a hook of the type described, a tubular swivel body, a bail mounted on said body for suspending the body, a main hook mounted for limited movement in said body axially thereof, resilient means yieldably resisting movement of said main hook relative to said body under influence of a load on the hook, an auxiliary hook mounted in said main hook for limited movement longitudinally thereof, and a secondary resilient means yieldably resisting movement of said auxiliary hook relative to the main hook under influence of a load on said auxiliary hook.

15. In a hook of the type described, a tubular swivel body, a bail mounted on said body, a main hook including a shank extending through said swivel body, an abutment on the end of said shank, a compression spring surrounding said shank interposed between said abutment and said body, means on said body engageable by said abutment limiting relative movement of said main hook and said body axially of said shank, an auxiliary hook mounted in said main hook for limited movement longitudinally thereof, and a second spring between said auxiliary hook and said main hook yieldably resisting movement of said auxiliary hook relative to said main hook under influence of a load on said auxiliary hook.

BURT S. MINOR.

REFERENCES CITED

The following references are of record in the file of this patent:

UNITED STATES PATENTS

| Number | Name | Date |
| --- | --- | --- |
| 2,158,372 | Long | May 16, 1939 |
| 2,196,460 | Hertel | Apr. 9, 1940 |
| 2,203,139 | Grau et al. | June 4, 1940 |